United States Patent
Klemm et al.

(10) Patent No.: US 9,733,862 B1
(45) Date of Patent: Aug. 15, 2017

(54) SYSTEMS AND METHODS FOR REVERSE POINT-IN-TIME COPY MANAGEMENT IN A STORAGE SYSTEM

(71) Applicant: Dell Products L.P., Round Rock, TX (US)

(72) Inventors: Michael J. Klemm, Minnetonka, MN (US); Joris Johannes Wils, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/074,520

(22) Filed: Mar. 18, 2016

(51) Int. Cl.
*G06F 3/06* (2006.01)

(52) U.S. Cl.
CPC ............ *G06F 3/065* (2013.01); *G06F 3/0619* (2013.01); *G06F 3/0665* (2013.01); *G06F 3/0683* (2013.01)

(58) Field of Classification Search
CPC ...... G06F 3/065; G06F 3/0619; G06F 3/0665; G06F 3/0683
USPC ................ 711/162, 114, 154, 202, 205, 221; 707/639, 649, 673
See application file for complete search history.

(56) References Cited

U.S. PATENT DOCUMENTS

| | | | | | |
|---|---|---|---|---|---|
| 6,748,504 | B2 * | 6/2004 | Sawdon | ............... | G06F 11/1435 707/999.202 |
| 6,829,617 | B2 * | 12/2004 | Sawdon | ............... | G06F 11/1435 |
| 6,959,310 | B2 * | 10/2005 | Eshel | ................ | G06F 17/30067 |
| 7,043,503 | B2 * | 5/2006 | Haskin | ................ | G06F 11/1435 |
| 7,085,785 | B2 * | 8/2006 | Sawdon | ............ | G06F 17/30067 |
| 7,111,014 | B2 * | 9/2006 | Sawdon | .............. | G06F 11/1435 |
| 7,216,135 | B2 * | 5/2007 | Sawdon | ............ | G06F 17/30067 |
| 7,502,801 | B2 * | 3/2009 | Sawdon | .............. | G06F 11/1435 |
| 7,814,057 | B2 * | 10/2010 | Kathuria | ............. | G06F 11/1471 707/646 |
| 7,827,350 | B1 * | 11/2010 | Jiang | .................... | G06F 11/1469 707/639 |
| 7,849,352 | B2 * | 12/2010 | Soran | .................... | G06F 3/0608 714/5.11 |
| 8,458,138 | B1 * | 6/2013 | Sirianni | ............ | G06F 17/30221 707/679 |
| 8,473,776 | B2 * | 6/2013 | Soran | .................... | G06F 3/0608 714/5.1 |
| 8,996,841 | B2 * | 3/2015 | Kuligowski | .......... | G06F 3/0605 711/162 |
| 2003/0158834 | A1 * | 8/2003 | Sawdon | ............ | G06F 17/30067 |
| 2003/0158861 | A1 * | 8/2003 | Sawdon | .............. | G06F 11/1435 |
| 2003/0158862 | A1 * | 8/2003 | Eshel | ................ | G06F 17/30067 |
| 2003/0158863 | A1 * | 8/2003 | Haskin | ................ | G06F 11/1435 |
| 2003/0158873 | A1 * | 8/2003 | Sawdon | ............ | G06F 17/30067 |
| 2003/0159007 | A1 * | 8/2003 | Sawdon | .............. | G06F 11/1435 711/154 |

(Continued)

Primary Examiner — Stephen Elmore
(74) Attorney, Agent, or Firm — Jackson Walker L.L.P.

(57) ABSTRACT

A method may include generating a chain of snapshot point-in-time copies (PITCs) for a virtual volume, the chain comprising one or more reverse PITCs and one active PITC, such that: (i) read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and (ii) read operations to the virtual volume traverse only the active PITC in order to return data responsive to the read operations to the virtual volume.

21 Claims, 9 Drawing Sheets

(56) References Cited

U.S. PATENT DOCUMENTS

| | | | |
|---|---|---|---|
| 2005/0050110 A1* | 3/2005 | Sawdon | G06F 11/1435 |
| 2006/0206536 A1* | 9/2006 | Sawdon | G06F 11/1435 |
| 2006/0224636 A1* | 10/2006 | Kathuria | G06F 11/1471 |
| 2007/0180306 A1* | 8/2007 | Soran | G06F 3/0608 |
| | | | 714/5.11 |
| 2009/0198949 A1* | 8/2009 | Kuligowski | G06F 3/0605 |
| | | | 711/203 |
| 2013/0339309 A1* | 12/2013 | Sirianni | G06F 17/30221 |
| | | | 707/674 |
| 2016/0357446 A1* | 12/2016 | Soran | G06F 3/0608 |

\* cited by examiner

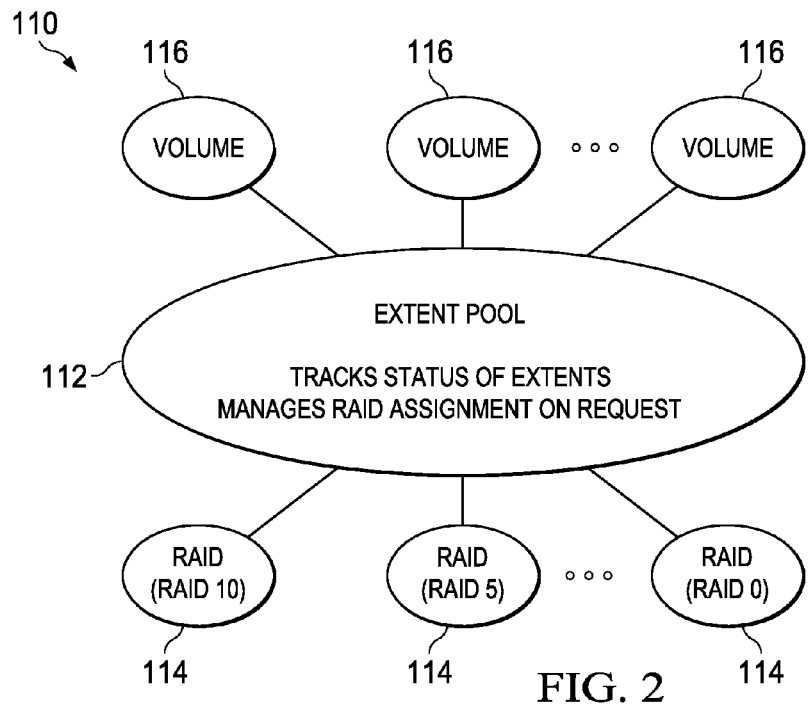
FIG. 2
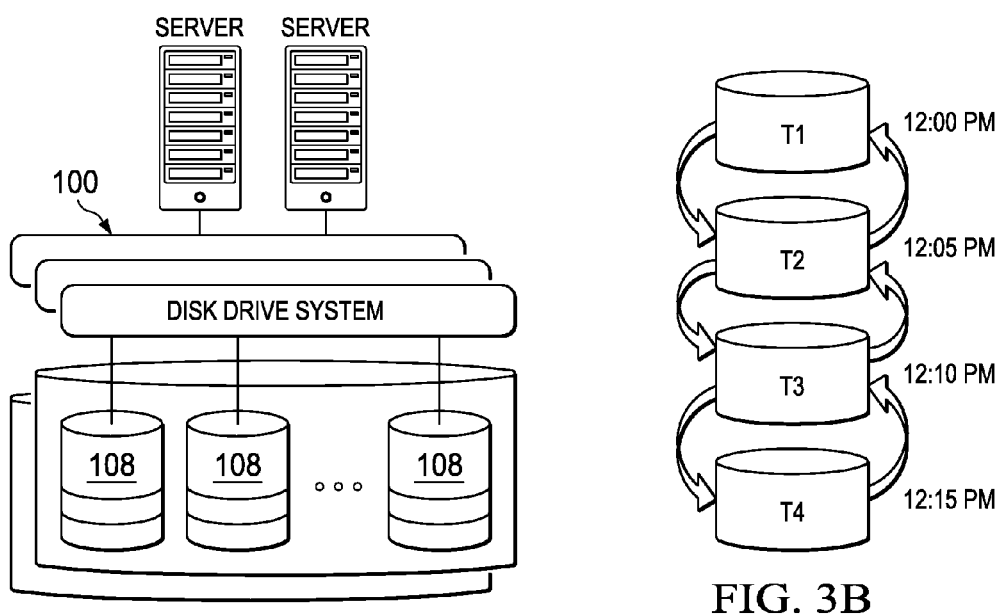
FIG. 3A
FIG. 3B

SYSTEMS AND METHODS FOR REVERSE POINT-IN-TIME COPY MANAGEMENT IN A STORAGE SYSTEM

TECHNICAL FIELD

The present disclosure generally relates to a disk drive system and method, and more particularly to systems and methods for managing a reverse point-in-time copy chain.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In this regard, RAID, an acronym for Redundant Array of Independent Disks, is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 5, RAID 10, etc.

RAID includes data storage schemes that can divide and replicate data among multiple physical disk drives. The physical disks are said to be in a RAID array, which is addressed by the operating system as one single disk. Many different schemes or architectures of RAID devices are known to those having ordinary skill in the art. Each different architecture or scheme may provide a different balance among various goals to be achieved in storing data, which include, but are not limited to, increased data reliability and increased input/output (hereinafter "I/O") performance.

Some storage systems are able to support data instant replay by taking point-in-time copies (PITCs) or "snapshots" of data at a point in time, and a logical volume may point to such point-in-time copy, such that by accessing the volume, one may access the point-in-time copy. A logical volume is used like a remote disk by an initiator, typically a computer, such as a server.

The conventional way to support a snapshot storage system is to collect the written data extents into a PITC, which is a data structure that may be referenced by a volume. A data extent is a collection of data bytes characterized by a block address and a length. The block address defines a location on a disk (e.g., a virtual disk or volume). The length is the number of bytes of the data extent. To implement a PITC, a device may write the volume extents written by the initiator during a specific period of time onto extents on a virtual disk as presented by RAID. The PITC database may include the relationship between the volume extents and the RAID extents (which may also be known as "chunks").

The volume itself may be mapped to a chain of PITCs. The volume writes to a PITC at the head of the chain, which may be referred to as the active PITC. When a snapshot is taken, the active PITC is frozen and a new one is created and placed at the head of the PITC chain. This repeats each time a snapshot is taken. Reads to a volume traverse the chain in order looking for partial match VBAs and length. When a snapshot is deleted and assuming no volume cloning the corresponding PITC is deleted, the extents in the deleted PITC's map extents are coalesced (e.g., merged) into the next newest PITC. PITCs are typically implemented as variant B-Trees or other Key Value stores.

Such a traditional approach to PITC management has a number of major weaknesses. First, the number of PITC lookups scales linearly with the number of snapshots taken. Therefore, performance will suffer in a system with many snapshots. The typical means to address this scaling is to use approximate membership query filters, such as bloom filters. However, these structures may have scaling and complexity issues of their own. This lookup scaling is expensive for volumes that have frequently read read-only data. Over time, as snapshots are deleted due to aging, read-only data ends up at the end of a PITC chain. Thus a read for such data may require a traversal of the entire chain, and thus maximal overhead. This is particularly expensive when the read-only data is frequently read.

Second, coalesce operations may be so database intensive that they negatively affect performance. The PITC that corresponds with the oldest snapshot—assuming a typical delete oldest snapshot schedule—typically becomes much larger than all the other PITCs. It typically contains an entry for each extent that was ever written to the volume. Each time the oldest snapshot is deleted, this "bottom" PITC is bound to the next oldest snapshot. Thus, when a snapshot is deleted, extents in the next oldest snapshot are coalesced into the bottom PITC. If the bottom PITC is implemented as B-Tree and the next oldest snapshot has a roughly even distribution of entries, then each entry in the next oldest snapshot will cause a B-Tree node to be read and written. Since entries are small compared to the nodes, in many cases the coalesce could cause every leaf node of the bottom PITC to be updated. The typical means to address this is to delay the coalesce until many PITCs can be coalesced in batch into the bottom PITC. However, these batching operations may have scaling and complexity issues of their own.

Third, the traditional approach does not provide a natural way to determine which extents are referenced by the volume lookups and which bio are only referenced by snapshot lookups. Statistics typically require distinguishing these two types of space usage. To make this distinction requires an inspection of each extent of each PITC in the entire chain.

Fourth, the traditional approach may render it expensive to do tiering. Tiering involves optimal placement of a volume's extents on storage media based on expected load. Tiering requires copying written extents from one storage device to another. After the copy, the corresponding entries in the PITCs are updated to reflect the new location of the written extents. Tiering is usually done at some granularity in the volume's addressable space (LBA space). Written extents are typically recorded in the PITCs at the granularity at which user data is written, the mode sizes of which are 4 kB and 64 kB in many cases. The tiering granularity depends on the RAM resources required of the system to track and calculate usage and such tiering granularity is typically much larger by an order of magnitude of more than 1 MB. Therefore, when one tiering granular unit is moved, multiple written extents must be updated. If these written extents are spread over multiple PITCs, then this update requires an update to each PITC, which is expensive.

Fifth, the traditional approach may render it expensive to optimize the metadata to the user data. The most-recently used or "hottest" data is usually latency sensitive, and delays caused by metadata lookups make up much of the latency. The way to minimize the metadata latency is to organize the metadata such that all the metadata associated with the hottest data is in RAM. To save RAM, this may require the metadata associated with colder data to be stored to solid-state storage devices (SSD). In the above style, this requires each PITC to be split into two: one sub PITC for the hot data, one sub PITC for the cold data. Since the data is associated with many PITCs, the metadata is as well, which creates scaling challenges in separating the PITCs as described and moving the metadata around between the sub PITCs.

SUMMARY

In accordance with the teachings of the present disclosure, the disadvantages and problems associated with existing approaches to data storage may be substantially reduced or eliminated.

In accordance with embodiments of the present disclosure, a method of data fusion may include generating a virtual volume of disk space from a plurality of data storage devices, allocating the disk space of the virtual volume, writing data to the allocated disk space, automatically generating a snapshot point-in-time-copy (PITC) for the virtual volume, each snapshot PITC comprising a table of extents that point to extents on said plurality of data storage devices, storing an address index of each snapshot PITC such that each snapshot PITC of the virtual volume can be instantly located via the stored address index, and generating a chain of snapshot PITCs for the virtual volume, the chain comprising one or more reverse PITCs and one active PITC, such that: (i) read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and (ii) read operations to the virtual volume traverse only the active PITC in order to return data responsive to the read operations to the virtual volume.

In accordance with these and other embodiments of the present disclosure, a system may include a processor and a program of instructions embodied in non-transitory computer-readable media. The program of instructions may be configured to, when read and executed by the processor generate a virtual volume of disk space from a plurality of data storage devices, allocate the disk space of the virtual volume, write data to the allocated disk space, automatically generating a snapshot point-in-time-copy (PITC) for the virtual volume, each snapshot PITC comprising a table of extents that point to extents on said plurality of data storage devices, store an address index of each snapshot PITC such that each snapshot PITC of the virtual volume can be instantly located via the stored address index, and generate a chain of snapshot PITCs for the virtual volume, the chain comprising one or more reverse PITCs and one active PITC, such that: (i) read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and (ii) read operations to the virtual volume traverse only the active PITC in order to return data responsive to the read operations to the virtual volume.

In accordance with these and other embodiments of the present disclosure, an article of manufacture may include a non-transitory computer-readable medium and computer-executable instructions carried on the computer-readable medium. The instructions may be readable by a processor, and the instructions, when read and executed, may cause the processor to generate a virtual volume of disk space from a plurality of data storage devices, allocate the disk space of the virtual volume, write data to the allocated disk space, automatically generating a snapshot point-in-time-copy (PITC) for the virtual volume, each snapshot PITC comprising a table of extents that point to extents on said plurality of data storage devices, store an address index of each snapshot PITC such that each snapshot PITC of the virtual volume can be instantly located via the stored address index, generate a chain of snapshot PITCs for the virtual volume, the chain comprising one or more reverse PITCs and one active PITC, such that: (i) read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and (ii) read operations to the virtual volume traverse only the active PITC in order to return data responsive to the read operations to the virtual volume.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of an example dynamic data allocation having an extent pool of storage on one or more RAIDs, in accordance with the embodiments of the present disclosure;

FIGS. 3A and 3B illustrate schematic views of a snapshot of an example disk storage block of a RAID subsystem at a plurality of time-intervals, in accordance with the embodiments of the present disclosure;

DETAILED DESCRIPTION

Preferred embodiments and their advantages are best understood by reference to FIGS. 1 through 10, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
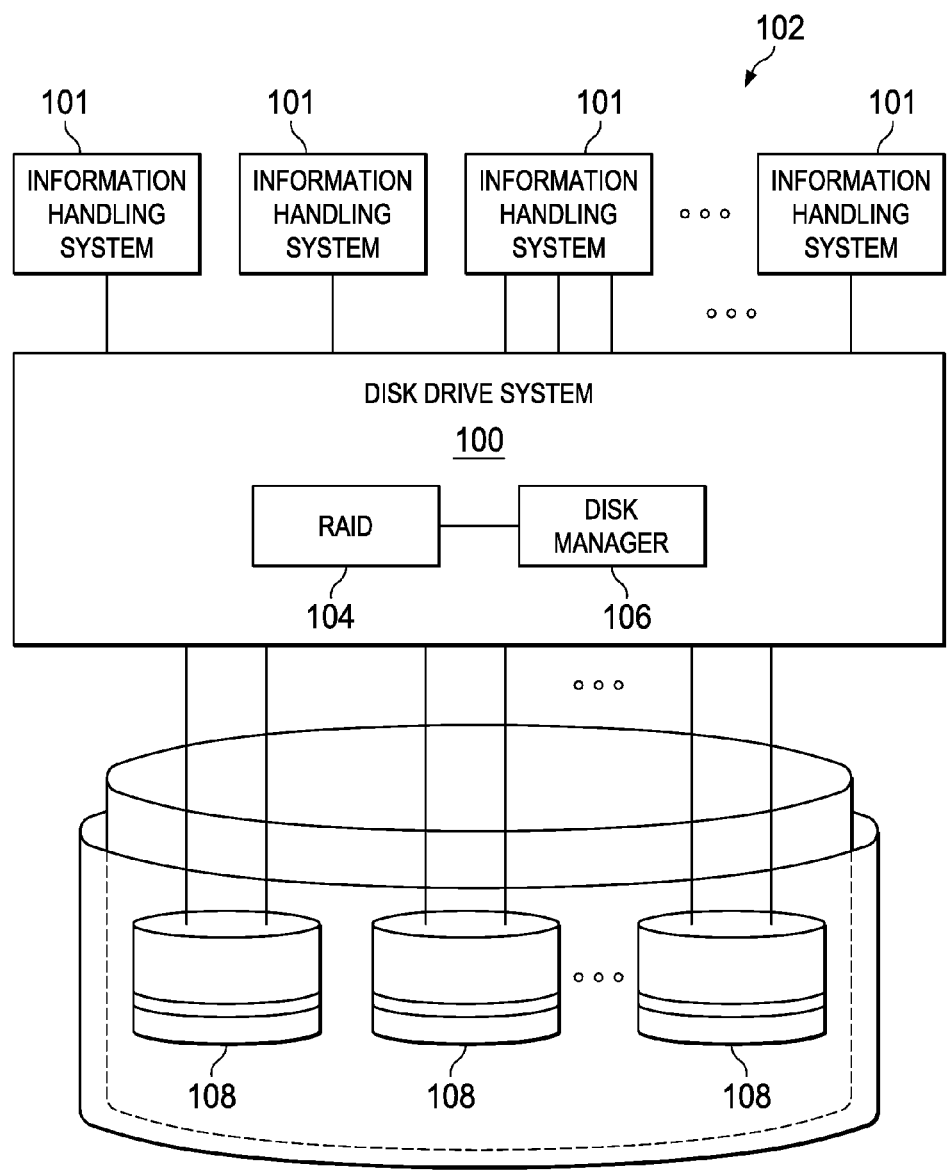
FIG. 1 illustrates a block diagram of an example disk drive system in an information handling system, in accordance with the embodiments of the present disclosure.

FIG. 1 illustrates a block diagram of an example disk drive system 100 in an information handling system environment 102, in accordance with embodiments of the present disclosure. As shown in FIG. 1, environment 102 may include one or more information handling systems 101 communicatively coupled to disk drive system 100. In some embodiments, an information handling system 101 may comprise a personal computer. In some embodiments, an information handling system 101 may comprise or be an integral part of a server. In other embodiments, an information handling system 101 may comprise a portable information handling system (e.g., a laptop, notebook, tablet, handheld, smart phone, personal digital assistant, etc.).

As shown in FIG. 1, disk drive system 100 may include a RAID subsystem 104 and a disk manager 106 having at least one disk storage system controller. Disk manager 106, as shown in FIG. 1, may generally manage disks and disk arrays, including grouping/resource pooling, abstraction of disk attributes, formatting, addition/subtraction of disks, and tracking of disk service times and error rates. Disk manager 106 may not distinguish the differences between various models of disks, and presents a generic storage device for the RAID component. Disk manager 106 may also provide grouping capabilities which facilitate the construction of RAID groups with specific characteristics such as 10,000 RPM disks, etc.

Thus, in embodiments of the present disclosure, the function of disk manager 106 may be at least three-fold: abstraction, configuration, and input/output (I/O) optimization. Disk manager 106 may present "disks" to upper layers which could be, for example, locally or remotely attached physical disk drives, or remotely attached disk systems. The common underlying characteristic is that any of these physical storage devices (e.g., disk drives 108) could be the target of I/O operations. The abstraction service of disk manager 106 may thus provide a uniform data path interface for the upper layers, particularly the RAID subsystem, and/or may provide a generic mechanism for the administrator to manage target devices (e.g., disk drives 108).

Disk manager 106 may also provide disk grouping capabilities to simplify administration and configuration. Disks can be named, and placed into groups, which can also be named. Grouping may be a powerful feature which simplifies tasks such as migrating volumes from one group of disks to another, dedicating a group of disks to a particular function, specifying a group of disks as spares, etc.

Disk manager 106 may also interface with devices, such as a Small Computer System Interface (SCSI) device subsystem which may be responsible for detecting the presence of external storage devices. Such a SCSI device subsystem may be capable, at least for Fibre Channel/SCSI/Serial-Attached SCSI (SAS) type devices, of determining a subset of devices which are block-type target storage devices. It is these devices which may be managed and abstracted by disk manager 106. In addition, disk manager 106 may be responsible for responding to flow control from a SCSI device layer. Accordingly, disk manager 106 may have queuing capabilities, which may present the opportunity to aggregate I/O requests as a method to optimize the throughput of disk drive system 100.

Furthermore, disk manager 106 may manage one or more disk storage system controllers. In some embodiments, a plurality of redundant disk storage system controllers may be implemented to cover the failure of an operated disk storage system controller. Redundant disk storage system controllers may also be managed by disk manager 106.

Disk manager 106 may interact with several other subsystems. For example, RAID subsystem 104 may be the major client of the services provided by disk manager 106 for data path activities. RAID subsystem 104 may use disk manager 106 as an exclusive path to disks 108 for I/O. RAID system 104 may also listen for events from disk manager 106 to determine the presence and operational status of disks 108. RAID subsystem 104 may also interact with disk manager 106 to allocate extents for the construction of RAID devices. In some embodiments of the present disclosure, RAID subsystem 104 may include a combination of at least one of RAID types, such as RAID-0, RAID-1, RAID-5, and RAID-10. It will be appreciated that other RAID types can be used in alternative RAID subsystems, such as RAID-3, RAID-4, RAID-6, and RAID-7, etc.

Disk manager 106 may also utilize services of the SCSI device layer to learn of the existence and operational status of block devices, and may have an I/O path to these block devices. Disk manager 106 may query the SCSI device subsystem about devices as a supporting method to uniquely identify disks.

In operation, RAID subsystem 104 and disk manager 106 may dynamically allocate data across disk space of a plurality of disk drives 108 based on RAID-to-disk mapping. In addition, RAID subsystem 104 and disk manager 106 may be capable of determining whether additional disk drives are required based on the data allocation across disk space. If the additional disk drives are required, a notification may be sent to a user so that additional disk space may be added if desired.

Disk drive system 100 may have a dynamic data allocation (referred to as "disk drive virtualization") in accordance with the present disclosure. FIG. 2 illustrates a block diagram of an example dynamic data allocation having an extent pool 112 of storage for a RAID, in accordance with the embodiments of the present disclosure. As shown in FIG. 2, disk storage system 110 may include an extent pool 112 of storage, e.g., a pool of data storage including a database which tracks the usage of various extents. For example, such database may track whether an extent is free, no longer needed/invalid, etc. Extent pool 112 may also may manage read/write assignments based on user's requests. As is known in the art, such extents may be of varying sizes. User's requested data storage volumes 116 may be sent to the extent pool 112 in order to obtain storage space in response to such requests. Each volume 116 may request same or different classes of storage devices with same or different RAID levels, e.g., RAID 10, RAID 5, RAID 0, etc.

Figure 3C:
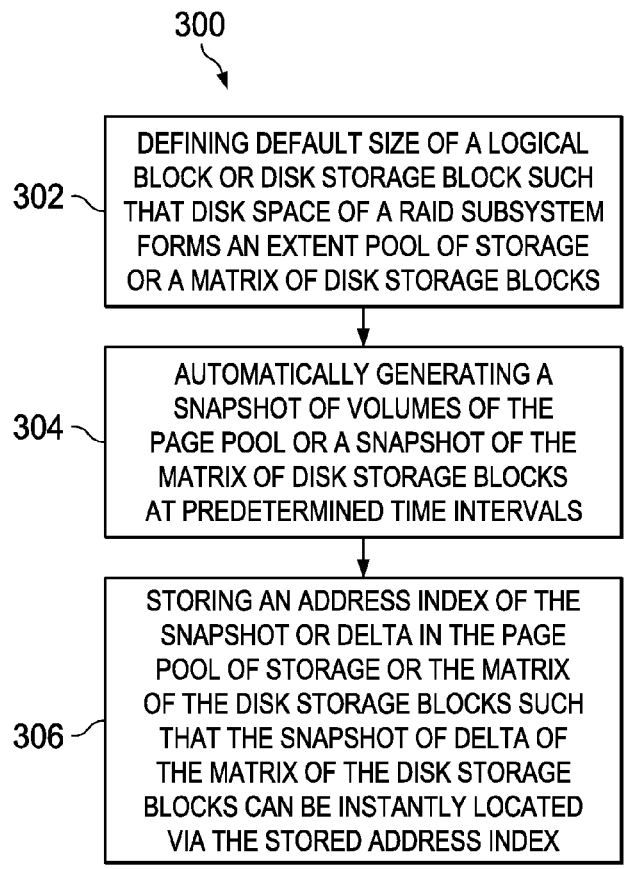
FIG. 3C illustrates a flowchart of an example method for data instant replay, in accordance with the embodiments of the present disclosure.

FIGS. 3A and 3B illustrate block diagrams of an example snapshot of a disk storage block of a RAID subsystem at a plurality of time-intervals, in accordance with embodiments of the present disclosure. FIG. 3C illustrates a block diagram of an example method for data instant replay. Method 300 may begin at step 302, which may include defining a default size of a logical block or disk storage block such that disk space of a RAID subsystem may form an extent pool of storage or a matrix of disk storage blocks. At step 304, the method may include automatically generating a snapshot of volumes of the extent pool or a snapshot of the matrix of disk storage blocks. At step 306, the method may include storing an address index of the snapshot or delta in the extent pool of storage or the matrix of the disk storage blocks such that the snapshot or delta of the matrix of the disk storage blocks may be instantly located via the stored address index.

As shown in FIG. 3B, at each predetermined time interval, e.g., 5 minutes, such as T1 (12:00 PM), T2 (12:05 PM), T3 (12:10 PM), and T4 (12:15 PM), a snapshot of the extent pool of storage or the matrix of disk storage blocks may automatically be generated. In some instances, snapshots may be generated responsive to user commands. The address indexes of the snapshots or delta in the extent pool of storage or the matrix of the disk storage blocks may be stored in the extent pool of storage or the matrix of the disk storage blocks such that the snapshot or delta of the extent pool of storage or the matrix of the disk storage blocks may be instantly located via the stored address index.

Accordingly, the data instant replay method may automatically generate snapshots of the RAID subsystem at user defined time intervals, and user configured dynamic time stamps, for example, every few minutes or hours, etc., or a time as directed by a server. In case of a system failure or virus attack, these time-stamped virtual snapshots allow data instant replay and data instant recovery in a matter of a few minutes or hours, etc. The technique may also be referred to as instant replay fusion, i.e., the data shortly before the crash or attack is fused in time, and the snapshots stored before the crash or attack can be instantly used for future operation.

Figure 4:
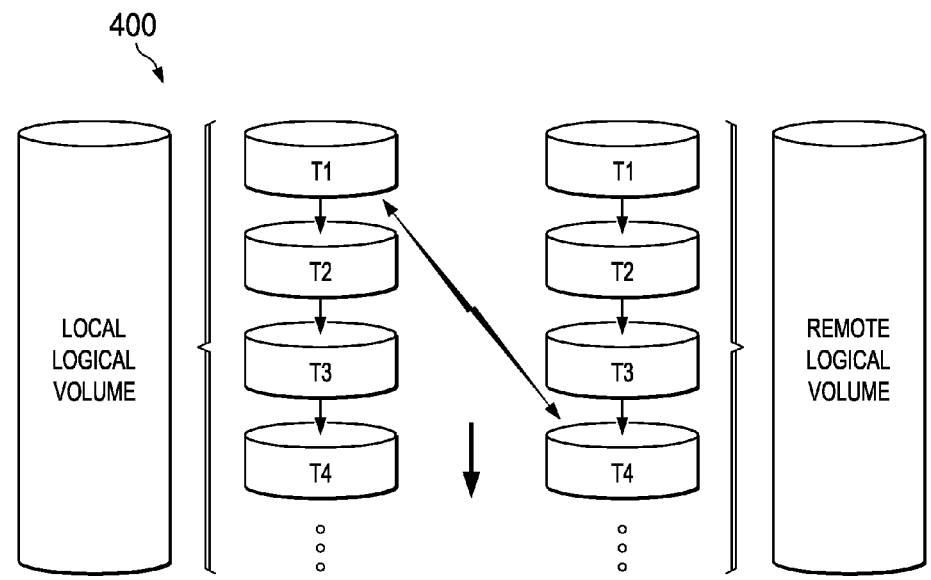
FIG. 4 illustrates a block diagram of an example local-remote data replication and instant replay function by using snapshots of disk storage blocks of a RAID subsystem, in accordance with the embodiments of the present disclosure.
Figure 4:
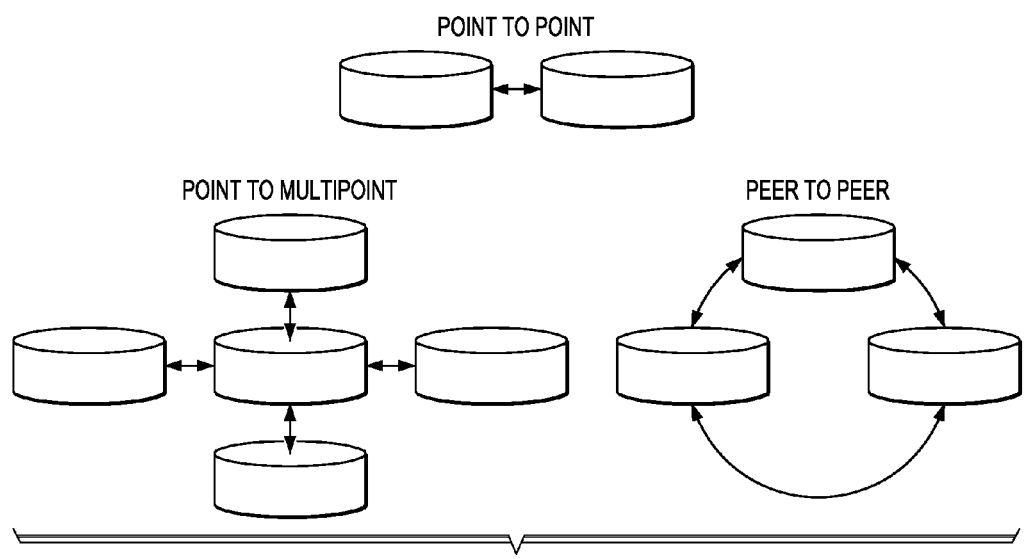

The snapshots may be stored at a local RAID subsystem or at a remote RAID subsystem so that if a major system crash occurs due to, for example, a terrorist attack, the integrity of the data may not be affected, and the data can be instantly recovered. FIG. 4 illustrates a block diagram of a local-remote data replication and instant replay function 400 by using snapshots of disk storage blocks of a RAID subsystem, in accordance with embodiments of the present disclosure.

Remote replication and instant replay function 400 may perform the service of replicating volume data to a remote system. It may attempt to keep the local and remote volumes as closely synchronized as possible. In some embodiments, the data of the remote volume may not mirror a perfect copy of the data of the local volume. Network connectivity and performance may cause the remote volume to be out of synchronization with a local volume.

Another feature of the data instant replay and data instant fusion method may be that the snapshots maybe used for testing while the system retains its operation. Live data may be used for real-time testing.

An example of data instant replay is to utilize snapshots of disk storage blocks of a RAID subsystem, in accordance with embodiments of the present disclosure. A snapshot may record write operations to a volume so that a view may be created to see the contents of a volume in the past. A snapshot may thus also support data recovery by creating views to a previous PITC of a volume.

The core of a snapshot implementation may create, coalesce, management, and I/O operations of the snapshot. Snapshot implementations may monitor writes to a volume and create PITCs for access through view volumes. Snaphot implementations may also add a Logical Block Address (LBA) remapping layer to a data path within a virtualization layer. This may comprise another layer of virtual LBA mapping within an I/O path. A PITC may not copy all volume information, and it may merely modify a database that the remapping uses.

Snapshot implementations may track changes to volume data and provide an ability to view volume data from a previous point-in-time. Snapshot implementations may perform this function by maintaining a list of delta writes for each PITC.

Snapshot implementations may also provide multiple methods for PITC profiles including application-initiated, and time-initiated. Snapshot implementations may further provide the ability for an application to create a PITC. Applications may control creation of a PITC through an application programming interface (API) on an information handling system, which may be delivered to a snapshot API. Also, snapshot implementations may provide an ability to create a time profile.

Snapshot implementations may not implement a journaling system or recover all writes to a volume. Snapshot implementations may only keep the last write to a single address within a PITC window. Snapshot implementations may allow a user to create a PITC that covers a defined short period of time, such as minutes or hours, etc. To handle failures, snapshot implementations may write all information to disk. Snapshot implementations may maintain volume data extent pointers comprising the delta writes. Because databases may provide a map to the volume data, and without it the volume data may be inaccessible, the database information must handle controller failure cases.

View volume functions may provide access to a PITC. View volume functions may attach to any PITC within a volume, except the active PITC. Uses of view volume functions include testing, training, backup, and recovery. The view volume functions may allow write operations without modifying the underlying PITC the view volume is based on.

In some embodiments, a snapshot may be designed to optimize performance and ease of use at the expense of disk space. User requests may include I/O operations, creation of a PITC, and creation/deletion of a view volume. To enable these operations, snapshot implementations may use more disk space to store database information than the minimum required. For I/O operations, snapshot implementations may summarize the current state of a volume into a single database, so that all read and write requests may be satisfied by a single database. Snapshot implementations may reduce the impact on normal I/O operations as much as possible. For view volume operations, snapshot implementations may use the same database mechanism as the main volume data path. Snapshot implementations may minimize the amount of data copied. To do this, snapshot implementations may maintain a database of pointers for each PITC. Snapshot implementations may copy and move pointers, but it may not move the data on a volume. Snapshot implementations may manage a volume using variable-sized data extents. Tracking individual sectors may require massive amounts of memory for a single reasonable sized volume. Snapshot implementations may use the data space on the volume to store the data-extent databases. Such databases may be reproduced after a controller failure. The database may allocate extents and sub-divide them. Snapshot implementations may handle controller failure by requiring that a volume using a snapshot operate on a single controller in some embodiments. Such embodiments may require no coherency, as all changes to a volume may be recorded on disk or to reliable cache for recovery by a replacement controller. Recovery from a controller failure may require that the snapshot information be read from disk in some embodiments. Snapshot implementations may use the virtualization RAID interface to access storage. Snapshot implementations may use multiple RAID devices as a single data space. Snapshot implementations may support N PITCs per volume and M views per volume, wherein the limitations on N and M may be a function of disk space and memory of a storage controller.

Figure 5:
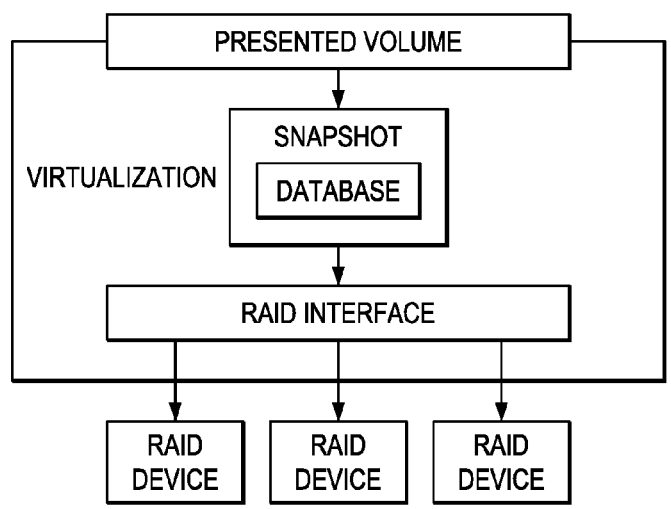
FIG. 5 illustrates a block diagram of an example snapshot using the same RAID interface to perform I/O and concatenating multiple RAID devices into a volume, in accordance with the embodiments of the present disclosure.

Snapshots may add a logical block address (LBA) remapping layer to a volume. The remapping may use the I/O request LBA and the database to convert the address to an extent. As shown in FIG. 5, a presented volume using snapshot may behave the same as a volume without snapshot. It may have a linear LBA space and may handle I/O requests. Snapshot implementations may use the RAID interface to perform I/O and may include multiple RAID devices in a volume. In some embodiments, the size of the RAID devices for a snapshot volume may not be the size of the presented volume. The RAID devices may allow snapshot implementations to expand the space for extents within the volume.

A new volume, with snapshot enabled at the inception, may only need to include space for new data extents. Snapshot implementations may not create a list or database of extents to place in the bottom-level PITC. The bottom-level PITC may be empty in this case. At allocation, all PITC extents may be free. By creating a volume with snapshot enabled at the inception, it may allocate less physical space than the volume presents. Snapshot implementations may track the writes to the volume. In some embodiments of the present disclosure, a NULL volume is not copied and/or stored in the extent pool or matrix, thereby increasing the efficiency of the use of the storage space.

In some embodiments, for both allocation schemes described above, a PITC implementation may place a virtual NULL volume at the bottom of the list. Reads to the NULL volume may return blocks of zero. The NULL volume may handle sectors not previously written by an information handling system. Writes to the NULL volume may not occur. A volume may use a NULL volume for reads to unwritten sectors.

A number of free extents depends on the size of a volume, the number of PITC, and the expected rate of data change. The storage system may determine the number and sizes of extents to allocate for a given volume. The number and sizes of extents may expand over time. Expansion may support a more rapid change in data than expected, more PITC, or a larger volume. New extents may be added as free extents. The addition of free extents may occur automatically.

Snapshot implementations may use data extents to manage the volume space. Using the operating system may tend to write a number of sectors in the same area of a volume. Memory requirements may also dictate that snapshot uses extents to manage volumes.

Figure 6:
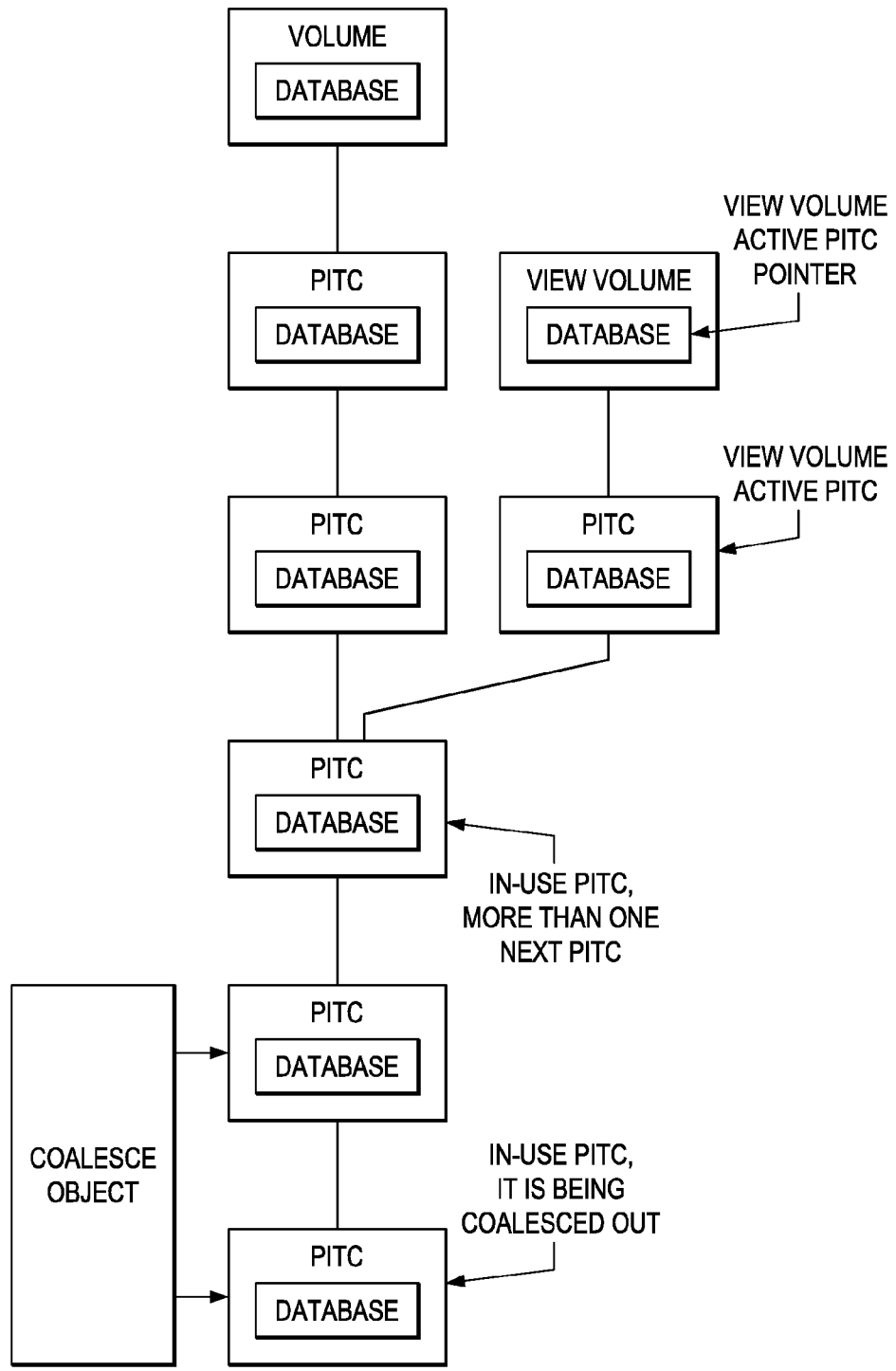
FIG. 6 illustrates a block diagram of an example snapshot structure, in accordance with the embodiments of the present disclosure.

FIG. 6 illustrates a block diagram of a snapshot structure, in accordance with embodiments of the present disclosure. Snapshot implementations may add a number of objects to a volume structure. Additional objects may include the PITC, a pointer to an active PITC, a database, child view volumes, and PITC coalesce objects. An active PITC pointer may be maintained by a volume. The active PITC may handle the mapping of read and write requests to the volume. The active pointer may include a summary of the current location of all the data within the volume. The database may track the available extents on the volume. The optional child view volumes may provide access to the volume PITCs. The view volumes may include their own active PITC to record writes to the PITC, while not modifying the underlying data. A volume may support multiple child view volumes. Snapshot coalesce objects may temporarily link two PITC for the purpose of removing a previous PITC. Coalescing of PITC may involve moving the ownership of extents and freeing of extents. A PITC may include a database for the extents written while the PITC was active. A PITC may include a freeze time stamp at which point the PITC stopped accepting write requests. The PITC may also include a Time-to-Live value that may determine at what time the PITC will coalesce.

Also, snapshot implementations may summarize the data extent pointers for the entire volume, at the time a PITC is taken to provide predictable read and write performance. Other solutions may require reads to examine multiple PITC to find the newest pointer. These solutions require database caching algorithms, but have worst-case performance.

Snapshot summarizing in the present disclosure may also reduce the worst-case memory usage of a database. It may require that the entire database be loaded into memory, but it may require only a single database be loaded.

The summary may include extents owned by the current PITC and may include extents from all previous PITC. To determine which extends the PITC may write, the summary may track extent ownership for each data extent. It may also track ownership for a coalesce process. To handle this, the data extent pointer may include an extent index.

A PITC database may include various variables to describe the various components thereof. A PITC database may refer to a "chunk," which is a RAID extent. A chunk may typically only be returned to an extent pool as one unit, and thus may be assumed to be indivisible. Thus, references to portions of a chunk may include an offset into the chunk and a length of such portion. An "extent" for purposes of a PITC database may include its address on a volume (e.g., virtual volume) and a length of the extent. Accordingly each entry in a PITC database may include an extent as its key or index, with such key or index having a value including a chunk, an offset into the chunk, a tail Boolean, and a return Zer Boolean.

Figure 7:
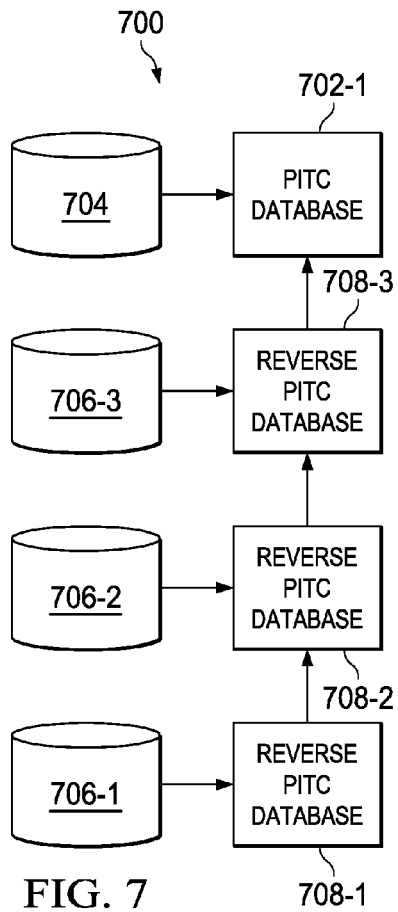
FIG. 7 illustrates a block diagram of a PITC chain, in accordance with embodiments of the present disclosure.
Figure 8:
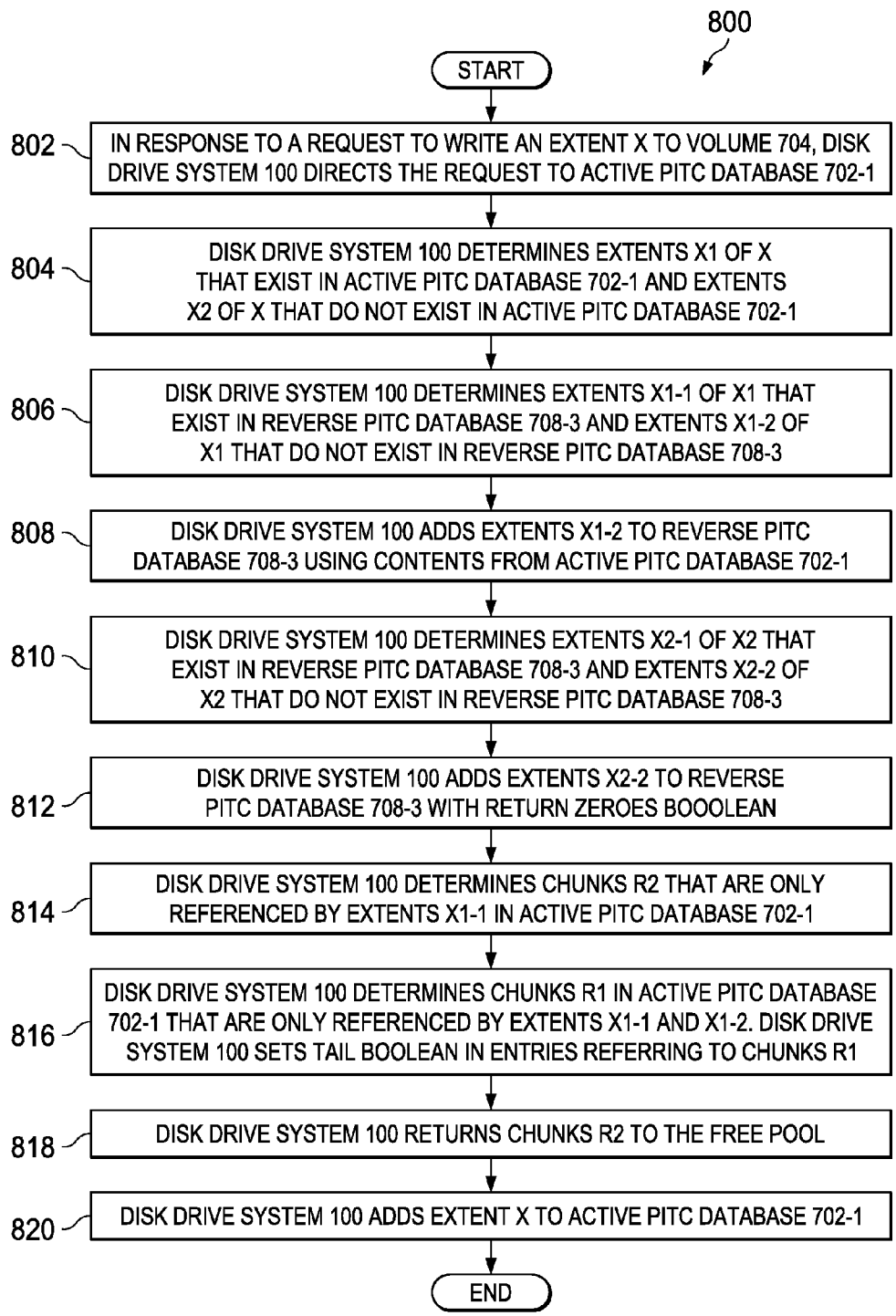
FIG. 8 illustrates a flow chart of an example method for writing to a volume implementing a reverse PITC chain, in accordance with embodiments of the present disclosure.

Creation and use of reverse PITCs may be illustrated in FIGS. 7 and 8. FIG. 7 illustrates a block diagram of a Volume mapping 700, in accordance with embodiments of the present disclosure. As shown in FIG. 7, volume mapping 700 may be for a volume 704 having snapshots 706-1, 706-2, and 706-3, where snapshot 706-1 is the oldest snapshot and snapshot 706-3 is the most recent snapshot. Also as shown in FIG. 7, snapshot 706-1 may point to reverse PITC database 708-1, which in turn may point to reverse PITC database 708-2. Snapshot 706-2 may point to reverse PITC database 708-2, which in turn may point to a reverse PITC database 708-3. A most-recent snapshot 706-3 may point to a reverse PITC database 708-3, which itself may point to active PITC database 702-1. Volume 704 may also point to active PITC database 702-1.

FIG. 8 illustrates a flow chart of an example method 800 for writing an extent to a volume implementing a reverse PITC chain, in accordance with embodiments of the present disclosure. According to some embodiments, method 800 may begin at step 802. As noted above, teachings of the present disclosure may be implemented in a variety of configurations of environment 102. As such, the preferred initialization point for method 800 and the order of the steps comprising method 800 may depend on the implementation chosen.

Figure 9A:
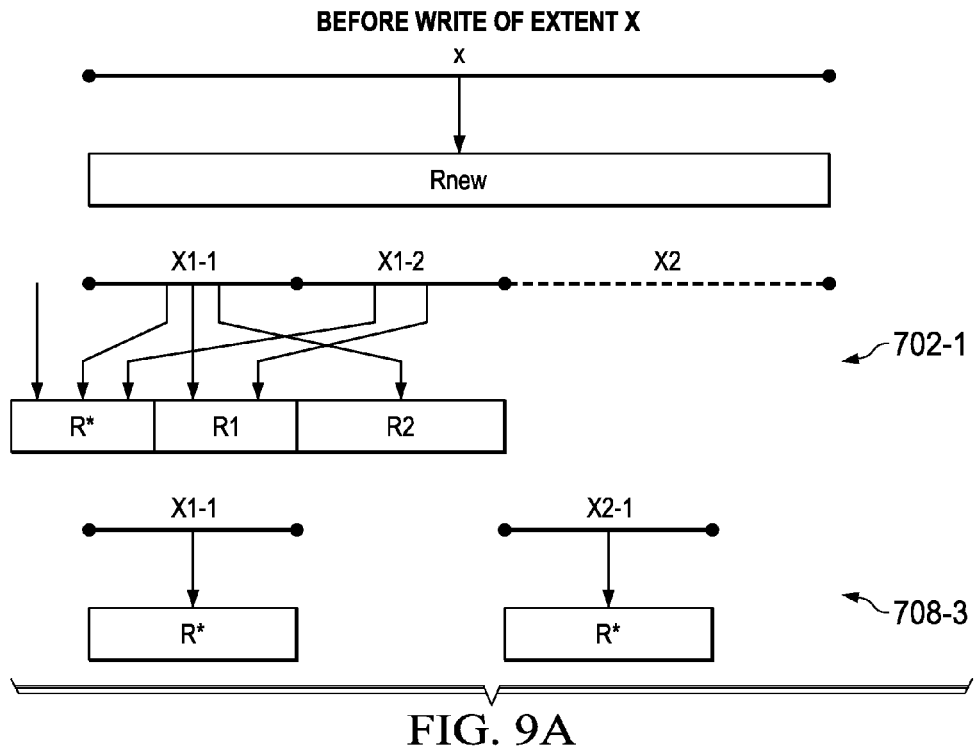
FIG. 9A depicts an active PITC database and a reverse PITC database before write of an extent, in accordance with embodiments of the present disclosure.

At step 802, in response to a request to write an extent X to volume 704, disk drive system 100 may direct the request to active PITC database 702-1. FIG. 9A depicts active PITC database 702-1 and reverse PITC database 708-3 prior to the write of extent X. At step 804, disk drive system 100 may read active PITC database 702-1 to determine extents X1 of X that exist in active PITC database 702-1 and extents X2 of X that do not exist in active PITC database 702-1.

Figure 9B:
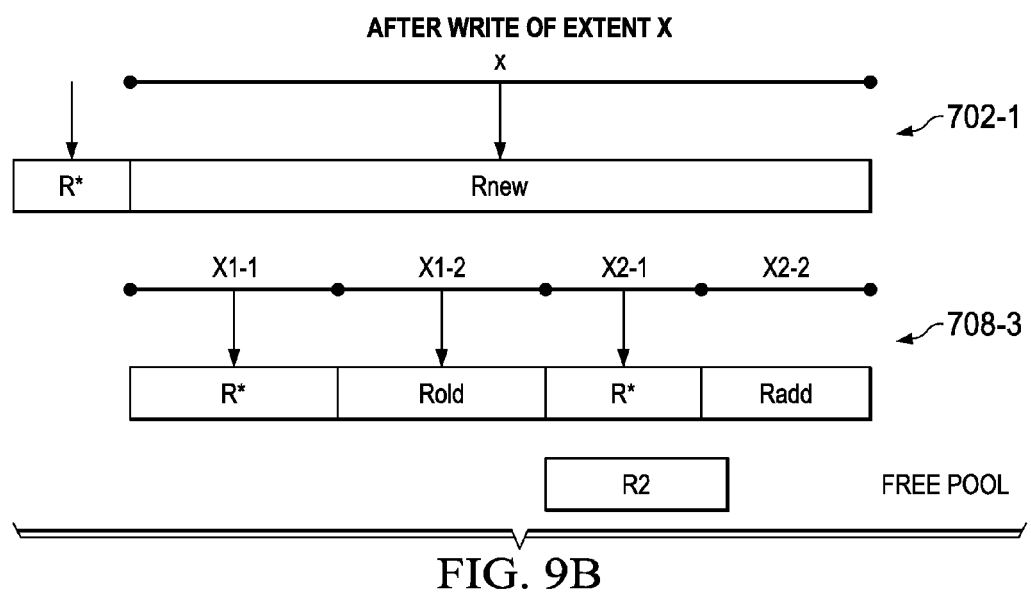
FIG. 9B depicts an active PITC database and a reverse PITC database after write of an extent, in accordance with embodiments of the present disclosure.

At step 806, disk drive system 100 may read reverse PITC database 708-3 to determine extents X1-1 of X1 that exist in reverse PITC database 708-3 and extents X1-2 of X1 that do not exist in reverse PITC database 708-3. At step 808, disk drive system 100 may add extents X1-2 to reverse PITC database 708-3 using contents (e.g., contents Rold as shown in FIGS. 9A and 9B) from active PITC database 702-1.

At step 810, disk drive system 100 may read reverse PITC database 708-3 to determine extents X2-1 of X2 that exist in reverse PITC database 708-3 and extents X2-2 of X2 that do not exist in reverse PITC database 708-3. At step 812, disk drive system 100 may add extents X2-2 to reverse PITC database 708-3 (e.g., contents Radd as shown in FIGS. 9A and 9B) and set the Return Zeroes Boolean.

At step 814, disk drive system 100 may determine chunks R2 that are only referenced by extents X1-1 in active PITC database 702-1.

At step 816, disk drive system 100 may determine chunks R1 that are only referenced by extents X1-1 and X1-2 in active PITC database 702-1. Disk drive system 100 may set the Tail Boolean in the entries referring to chunks R1.

At step 818, disk drive system 100 may return chunks R2 to the free pool.

At step 820, disk drive system 100 may add extent X to active PITC database 702-1 (e.g., contents Rnew as shown in FIGS. 9A and 9B) replacing the extents that may overlap it. After the end of step 820, method 800 may end. FIG. 9B depicts active PITC database 702-1 and reverse PITC database 708-3 after to the write of extent X.

Although FIG. 8 discloses a particular number of steps to be taken with respect to method 800, method 800 may be executed with greater or fewer steps than those depicted in FIG. 8. In addition, although FIG. 8 discloses a certain order of steps to be taken with respect to method 800, the steps comprising method 800 may be completed in any suitable order.

Method 800 may be implemented using environment 102 or any other system operable to implement method 800. In certain embodiments, method 800 may be implemented partially or fully in software and/or firmware embodied in computer-readable media (e.g., software and/or firmware embodying disk drive system 100).

For reads of volume 704, disk drive system 100 may simply read from active PITC database 702-1. For reads of a snapshot volume 706, disk drive system 100 may first read from the reverse PITC database 708 to which the snapshot volume points, and if the extent is not found, may traverse the chain of reverse PITCs databases from oldest to newest and finally the active PITC database 702-1.

At a point in time, a snapshot 706 may be deleted, which may require deletion of its associated reverse PITC database 708, and in some cases, a coalesce of such deleted reverse PITC database 708 with another reverse PITC database 708. If the oldest snapshot 706 is deleted, then each entry in PITC DB 708 must be inspected for the Tail flag. If an entry has that flag set then the associated chunk must be returned to the free pool. After this procedure the oldest reverse PITC database 708 may be deleted and no coalesce operation is required. On the other hand, if a snapshot 706 (e.g., snapshot 706-3) other than the oldest snapshot (e.g, snapshot 706-1) is deleted, it may be coalesced into its predecessor reverse PITC database 708.

Figure 10:
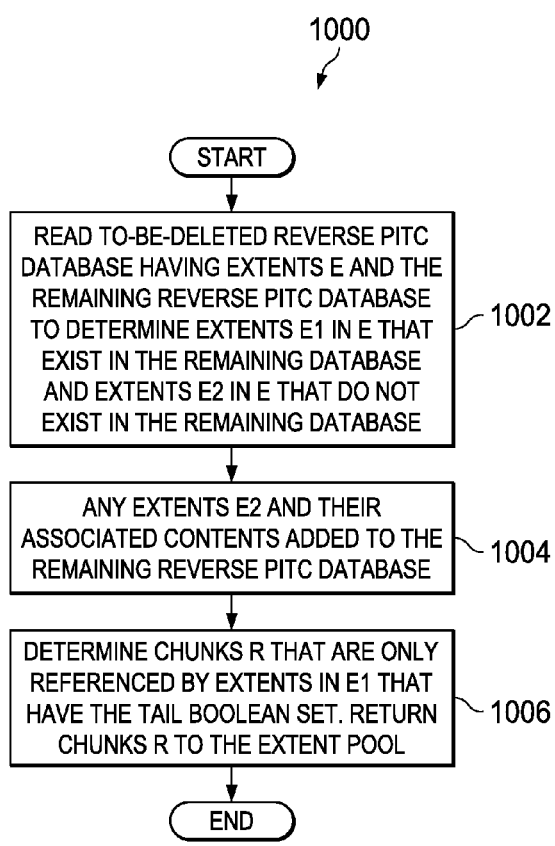
FIG. 10 illustrates a flow chart of an example method for coalescing reverse PITCs of a reverse PITC chain, in accordance with embodiments of the present disclosure.

FIG. 10 illustrates a flow chart of an example method 1000 for coalescing reverse PITCs databases 708 of reverse PITC chain 700, in accordance with embodiments of the present disclosure. According to some embodiments, method 1000 may begin at step 1002. As noted above, teachings of the present disclosure may be implemented in a variety of configurations of environment 102. As such, the preferred initialization point for method 1000 and the order of the steps comprising method 1000 may depend on the implementation chosen.

Figure 11A:
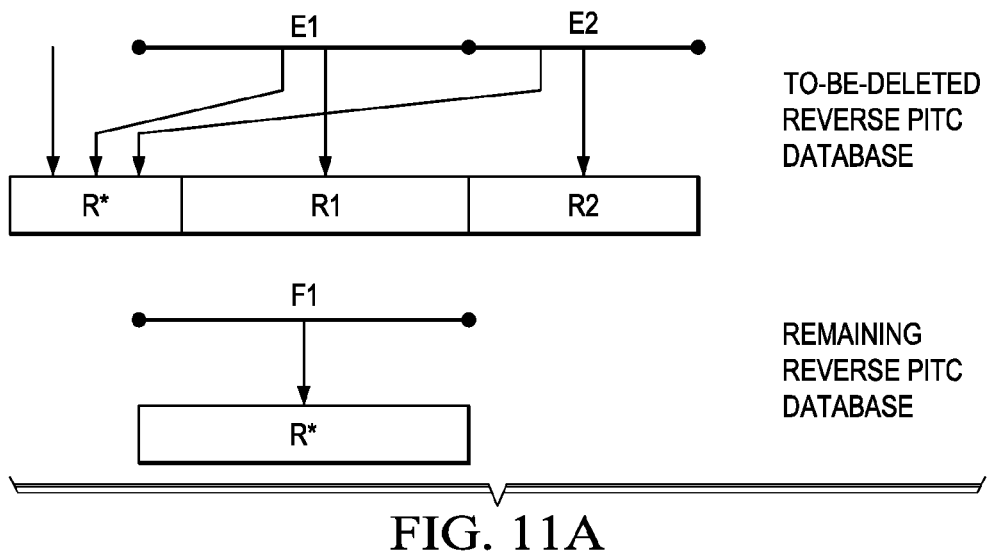
FIGS. 11A and 11B depict a to-be-deleted reverse PITC database and the remaining reverse PITC database prior to a coalesce operation and the remaining reverse PITC database after the coalesce operation.
Figure 11B:
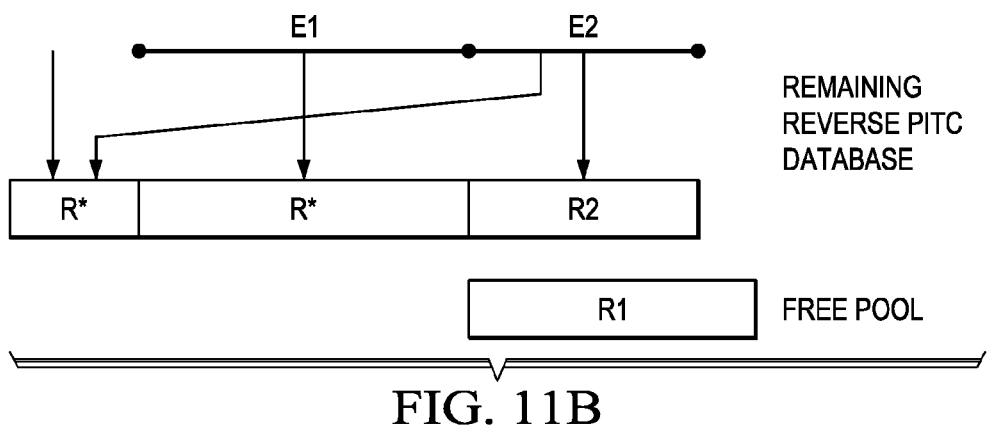

In connection with the description of method 1000, FIG. 11A depicts the to-be-deleted reverse PITC database and the remaining reverse PITC database prior to a coalesce operation and FIG. 11B depicts the remaining reverse PITC database after the coalesce operation.

At step 1002, disk drive system 100 may read the to-be-deleted reverse PITC database and collect extents E that exist in said database. Then system 100 will read remaining reverse PITC database 706-2 to determine extents E1 in E that exist in the remaining database and extents E2 in E that do not exist in the remaining database. At step 1004, any extents E2 and their associated contents may be added to the remaining reverse PITC database with necessary adjustments in chunk offsets.

At step 1006, determine the set of chunks R, which are exclusivity referred to by extents in E1 that have the Tail Boolean set. Return chunks R to the Extent Pool. After completion of step 1006, method 1000 may end.

Although FIG. 10 discloses a particular number of steps to be taken with respect to method 1000, method 1000 may be executed with greater or fewer steps than those depicted in FIG. 10. In addition, although FIG. 10 discloses a certain order of steps to be taken with respect to method 1000, the steps comprising method 1000 may be completed in any suitable order.

Method 1000 may be implemented using environment 102 or any other system operable to implement method 1000. In certain embodiments, method 1000 may be implemented partially or fully in software and/or firmware embodied in computer-readable media (e.g., software and/or firmware embodying disk drive system 100).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of data fusion, comprising:
generating a virtual volume of disk space from a plurality of data storage devices;
allocating the disk space of the virtual volume;
writing data to the allocated disk space;
automatically generating a snapshot point-in-time-copy (PITC) for the virtual volume, each snapshot PITC comprising a table of extents that point to extents on said plurality of data storage devices;
storing an address index of each snapshot PITC such that each snapshot PITC of the virtual volume can be instantly located via the stored address index; and
generating a chain of snapshot PITCs for the virtual volume, the chain comprising one or more reverse PITCs and one active PITC, such that:
read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and
read operations to the virtual volume traverse only the active PITC in order to return data responsive to the read operations to the virtual volume.

2. The method of claim 1, further comprising, in response to a write operation of an extent to the virtual volume, for portions of the extent present in the active PITC and not present in a most-recent reverse PITC, writing such portions to the most-recent reverse PITC from the active PITC.

3. The method of claim 1, further comprising, in response to a write operation of an extent to the virtual volume, for portions of the extent not present in the active PITC and not present in a most-recent reverse PITC, writing such portions to the most-recent reverse PITC.

4. The method of claim 1, further comprising, in response to a write operation of an extent to the virtual volume, for chunks referenced by portions of the extent but not that are not referenced by portions of the extent not present in a most-recent reverse PITC, returning such chunks to a free pool of storage.

5. The method of claim 1, further comprising, in response to a write operation of an extent to the virtual volume, writing the extent to the active PITC.

6. The method of claim 1, further comprising coalescing a first reverse PITC with a second reverse PITC into a resultant reverse PITC wherein the second reverse PITC is a next-older reverse PITC of the reverse PITCs with respect to the first reverse PITC such that if an extent exists in both the first reverse PITC and the second reverse PITC before the coalescing, the extent is placed in the resultant reverse PITC.

7. The method of claim 1, further comprising, in response to a request to delete an oldest reverse PITC of the reverse PITCs, deleting the oldest reverse PITC and determining chunks of the oldest reverse PITC are to be returned to a free pool.

8. A system comprising:
a processor; and
a program of instructions embodied in non-transitory computer-readable media and configured to, when read and executed by the processor:
generate a virtual volume of disk space from a plurality of data storage devices;
allocate the disk space of the virtual volume;
write data to the allocated disk space;
automatically generating a snapshot point-in-time-copy (PITC) for the virtual volume, each snapshot PITC comprising a table of extents that point to extents on said plurality of data storage devices;
store an address index of each snapshot PITC such that each snapshot PITC of the virtual volume can be instantly located via the stored address index; and
generate a chain of snapshot PITCs for the virtual volume, the chain comprising one or more reverse PITCs and one active PITC, such that:
read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and
read operations to the virtual volume traverse only the active PITC in order to return data responsive to the read operations to the virtual volume.

9. The system of claim 8, the program of instructions further configured to, in response to a write operation of an extent to the virtual volume, for portions of the extent present in the active PITC and not present in a most-recent reverse PITC, write such portions to the most-recent reverse PITC from the active PITC.

10. The system of claim 8, the program of instructions further configured to, in response to a write operation of an extent to the virtual volume, for portions of the extent not present in the active PITC and not present in a most-recent reverse PITC, write such portions to the most-recent reverse PITC.

11. The system of claim 8, the program of instructions further configured to, in response to a write operation of an extent to the virtual volume, for chunks referenced by portions of the extent but not that are not referenced by portions of the extent not present in a most-recent reverse PITC, return such chunks to a free pool of storage.

12. The system of claim 8, the program of instructions further configured to, in response to a write operation of an extent to the virtual volume, write the extent to the active PITC.

13. The system of claim 8, the program of instructions further configured to coalesce a first reverse PITC with a second reverse PITC into a resultant reverse PITC wherein the second reverse PITC is a next-older reverse PITC of the reverse PITCs with respect to the first reverse PITC such that if an extent exists in both the first reverse PITC and the second reverse PITC before the coalescing, the extent is placed in the resultant reverse PITC.

14. The system of claim 8, the program of instructions further configured, in response to a request to delete an oldest reverse PITC of the reverse PITCs, deleting the oldest reverse PITC and determining chunks of the oldest reverse PITC are to be returned to a free pool.

15. An article of manufacture comprising:
a non-transitory computer-readable medium; and
computer-executable instructions carried on the computer-readable medium, the instructions readable by a processor, the instructions, when read and executed, for causing the processor to:
generate a virtual volume of disk space from a plurality of data storage devices;
allocate the disk space of the virtual volume;
write data to the allocated disk space;
automatically generating a snapshot point-in-time-copy (PITC) for the virtual volume, each snapshot PITC comprising a table of extents that point to extents on said plurality of data storage devices;
store an address index of each snapshot PITC such that each snapshot PITC of the virtual volume can be instantly located via the stored address index; and
generate a chain of snapshot PITCs for the virtual volume, the chain comprising one or more reverse PITCs and one active PITC, such that:
read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and
read operations to the virtual volume traverse only the active PITC in order to return data responsive to the read operations to the virtual volume.

16. The article of claim 15, the program of instructions further configured to, in response to a write operation of an extent to the virtual volume, for portions of the extent present in the active PITC and not present in a most-recent reverse PITC, write such portions to the most-recent reverse PITC from the active PITC.

17. The article of claim 15, the program of instructions further configured to, in response to a write operation of an extent to the virtual volume, for portions of the extent not present in the active PITC and not present in a most-recent reverse PITC, write such portions to the most-recent reverse PITC.

18. The article of claim 15, the program of instructions further configured to, in response to a write operation of an extent to the virtual volume, for chunks referenced by portions of the extent but not that are not referenced by portions of the extent not present in a most-recent reverse PITC, return such chunks to a free pool of storage.

19. The article of claim 15, the program of instructions further configured to, in response to a write operation of an extent to the virtual volume, write the extent to the active PITC.

20. The article of claim 15, the program of instructions further configured to coalesce a first reverse PITC with a second reverse PITC into a resultant reverse PITC wherein the second reverse PITC is a next-older reverse PITC of the reverse PITCs with respect to the first reverse PITC such that if an extent exists in both the first reverse PITC and the second reverse PITC before the coalescing, the extent is placed in the resultant reverse PITC.

21. The article of claim 15, the program of instructions further configured, in response to a request to delete an oldest reverse PITC of the reverse PITCs, deleting the oldest reverse PITC and determining chunks of the oldest reverse PITC are to be returned to a free pool.

* * * * *

UNITED STATES PATENT AND TRADEMARK OFFICE
CERTIFICATE OF CORRECTION

PATENT NO.        : 9,733,862 B1
APPLICATION NO.   : 15/074520
DATED             : August 15, 2017
INVENTOR(S)       : Klemm et al.

Page 1 of 2

It is certified that error appears in the above-identified patent and that said Letters Patent is hereby corrected as shown below:

In the Claims

Column 15 Line 46 Claim 4 should read as follows:
4. The method of Claim 1, further comprising, in response to a write operation of an extent to the virtual volume, for chunks referenced by portions of the extent but that are not referenced by portions of the extent not present in a most-recent reverse PITC, returning such chunks to a free pool of storage.

Column 15 Line 1 Claim 8 should read as follows:
8. A system comprising:
    a processor; and
    a program of instructions embodied in non-transitory computer-readable media and configured to, when read and executed by the processor:
        generate a virtual volume of disk space from a plurality of data storage devices;
        allocate the disk space of the virtual volume;
        write data to the allocated disk space;
        automatically generate a snapshot point-in-time-copy (PITC) for the virtual volume, each snapshot PITC comprising a table of extents that point to extents on said plurality of data storage devices;
        store an address index of each snapshot PITC such that each snapshot PITC of the virtual volume can be instantly located via the stored address index; and
        generate a chain of snapshot PITCs for the virtual volume, the chain comprising one or more reverse PITCs and one active PITC, such that:
        read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and
        read operations to the virtual volume traverse only the active PITC in order to return data responsive to the read operations to the virtual volume.

Signed and Sealed this
Twenty-ninth Day of May, 2018

Andrei Iancu
*Director of the United States Patent and Trademark Office*

Column 15 Line 42 Claim 11 should read as follows:
11. The system of Claim 8, the program of instructions further configured to, in response to a write operation of an extent to the virtual volume, for chunks referenced by portions of the extent but that are not referenced by portions of the extent not present in a most-recent reverse PITC, return such chunks to a free pool of storage.

Column 15 Line 60 Claim 14 should read as follows:
14. The system of Claim 8, the program of instructions further configured to, in response to a request to delete an oldest reverse PITC of the reverse PITCs, delete the oldest reverse PITC and determine chunks of the oldest reverse PITC that are to be returned to a free pool.

Column 16 Line 1 Claim 15 should read as follows:
15. An article of manufacture comprising:
    a non-transitory computer-readable medium; and
    computer-executable instructions carried on the computer-readable medium, the instructions readable by a processor, the instructions, when read and executed, for causing the processor to:
    generate a virtual volume of disk space from a plurality of data storage devices;
    allocate the disk space of the virtual volume;
    write data to the allocated disk space;
    automatically generate a snapshot point-in-time-copy (PITC) for the virtual volume, each snapshot PITC comprising a table of extents that point to extents on said plurality of data storage devices;
    store an address index of each snapshot PITC such that each snapshot PITC of the virtual volume can be instantly located via the stored address index; and
    generate a chain of snapshot PITCs for the virtual volume, the chain comprising one or more reverse PITCs and one active PITC, such that:
    read operations to a snapshot pointing to a reverse PITC traverse a portion of the one or more reverse PITCs in a direction of the chain from the reverse PITC pointed to by the snapshot to the active PITC in order to return data responsive to the read operations to the snapshot; and
    read operations to the virtual volume traverse only the active PITC in order to return data responsive to the read operations to the virtual volume.

Column 16 Line 41 Claim 18 should read as follows:
18. The article of Claim 15, the program of instructions further configured to, in response to a write operation of an extent to the virtual volume, for chunks referenced by portions of the extent but that are not referenced by portions of the extent not present in a most-recent reverse PITC, return such chunks to a free pool of storage.

Column 16 Line 59 Claim 21 should read as follows:
21. The article of Claim 15, the program of instructions further configured to, in response to a request to delete an oldest reverse PITC of the reverse PITCs, delete the oldest reverse PITC and determine chunks of the oldest reverse PITC that are to be returned to a free pool.